Nov. 11, 1969  J. KLINK  3,477,675

SUPPORT FOR GAGING PROBE

Filed Dec. 27, 1967

INVENTOR
JOHN KLINK

BY *Darby & Darby*

ATTORNEYS

United States Patent Office 3,477,675
Patented Nov. 11, 1969

3,477,675
SUPPORT FOR GAGING PROBE
John Klink, Pine Plains, N.Y., assignor to Standard Gage Company, Inc., Poughkeepsie, N.Y., a corporation of New York
Filed Dec. 27, 1967, Ser. No. 693,864
Int. Cl. F16m *11/04*
U.S. Cl. 248—124                 10 Claims

ABSTRACT OF THE DISCLOSURE

The device described herein is a support for an electronic gaging probe and resembles the common "height gage." The device includes a column on a base, a head geared for vertical adjustment along a rack on the column, and a cross rack to support a gaging probe. The column is a heavy rigid column which is press-fitted in the base and in a base cover, the base and cover being fixed to the column at points spaced a short axial distance apart, a lever system being provided between the base and cover so that the column can be deflected by very slight and precise amounts, thereby providing fine adjustments, the amount of the adjustment being controlled by a screw which operates on the lever system.

---

In a precision gage it is esesntial, even though the sensing element or indicator probe requires but a very light contacting force, that the gage provide a high degree of stiffness of support while at the same time permitting a smooth-acting adjustment throughout the very limited range through which it must operate.

The present invention utilizes a column which is rigid and which is caused to deflect through a very small angle by means of a lever system, so that the adjustment through the narrow range possible is precise and smooth and due to loading of the lever system, at all times is maintained in a desired position of adjustment.

It is thus the main object of the invention to provide a gaging probe support having a very stiff supporting column which is arranged to be deflected through a very small angle by means of a lever system and an adjusting screw operating thereon to thus provide for very precise adjustment of the position of the indicator gage probe and to maintain that adjustment even when the precision is of the order of a few millionths of an inch.

Other objects and features of the invention will appear when the following description is considered in connection with the annexed drawings, in which.

Figure 1:
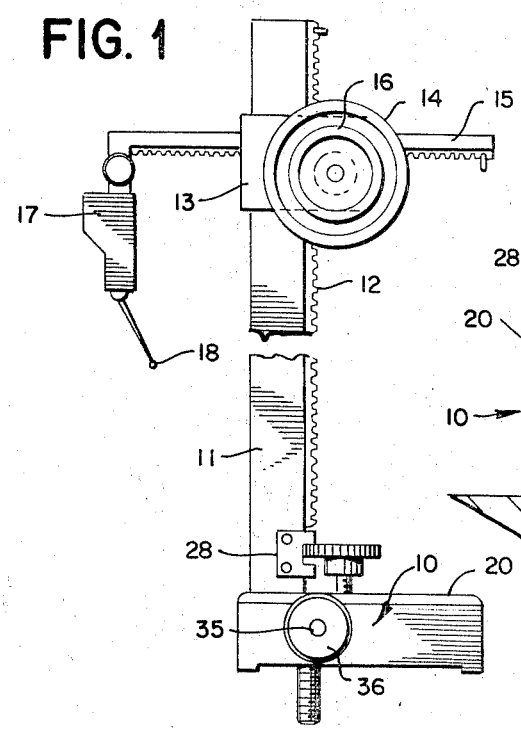
FIGURE 1 is a front elevational view of a gaging probe support in accordance with my invention.

Referring now to FIGURE 1, there is shown therein a gaging probe support having a base 10 and vertical column 11. Fixed to or integral with the column 11 is a rack 12 with which a gear (not shown) mounted in the head 13 meshes, the gear being connected in any suitable manner to the operating wheel or knob 14 whereby the head 13 may be adjusted vertically on the column 11.

A cross rack 15 is mounted in the head 13 for horizontal movement, the teeth of this rack being engaged by a second gear (not shown) which is connected to the operating knob or wheel 16. Fixed to the end of the rack 15 is a gaging probe head 17, the probe 18 of which engages the work piece.

Figure 2:
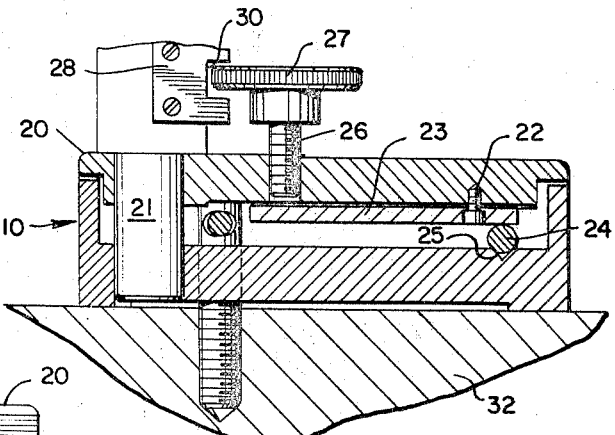
FIGURE 2 is a vertical cross-sectional view of the base of the support of FIGURE 1, showing the arrangement of the column base and column and the column deflecting lever system in its unoperated position.
Figure 3:
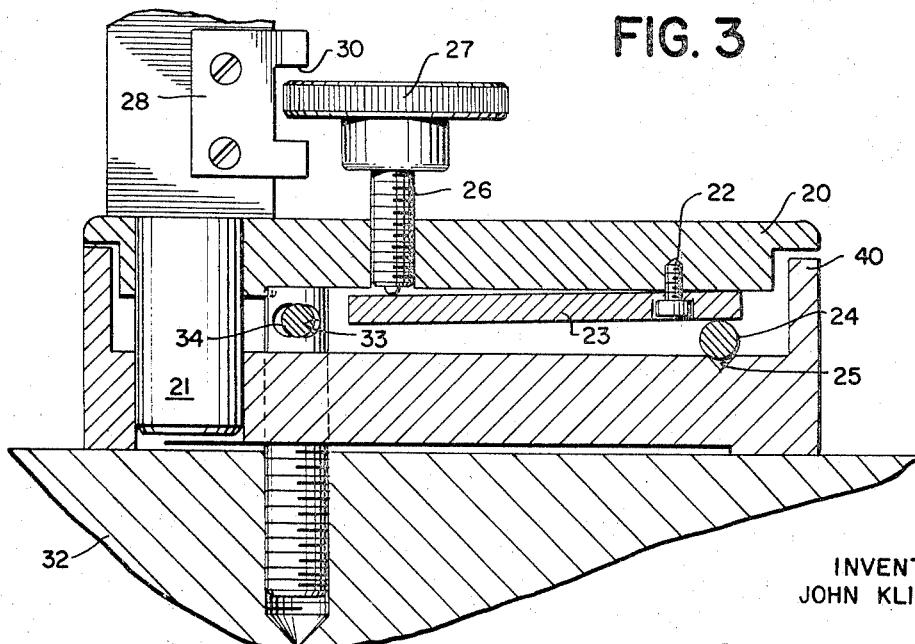
FIGURE 3 is an enlarged view similar to FIGURE 2, but showing the parts in an operated position with the column deflected.

The above construction is commonly employed in height gages and the like and forms no part of my invention, being shown simply to indicate the general type of gage to which the invention pertains. Referring now to FIGURES 2 and 3, it will be seen that the base 10 comprises the base 10 proper and the cover member 20, which two members, as will appear, are not joined together in any way, save that both are press-fitted to the cylindrical downward extension or shank 21 of the column 11, which column is ordinarily rectangular in cross-section.

As is clear from the drawings, the shank 21 is fixed to the base at one side thereof. Since as stated, both the cover and base proper are press-fitted on the shank of the column, and since the base and cover extend a considerable distance to the right, as seen in FIGURES 2 and 3, it will be obvious that a separation of the right-hand end of the cover with respect to the corresponding end of the base will cause the column extension 21 to bend between the top of the base and the bottom of the cover, the distance between these two positions being approximately one-half the diameter of the cylindrical shaft extension, which diameter is such as to provide a very stiff column, and may be for example 0.75″.

Loosely mounted, as by means of a screw 22, on the underside of the cover member adjacent the right-hand edge thereof, is a lever in the form of a plate 23, which lever extends both to the left and the right as seen in FIGURE 3. The right end bears against a roller 24 which is seated in a V-groove 25 in the upper surface of the base. The lefthand end of the lever 23 lies beneath the end of a crew 26 which is threaded into the cover 20 and which is provided at its upper end with a knurled operating knob 27, the movement of screw 26 being limited by virtue of the plate 28 which is fixed to the column 11 and which has a notch 30 encompassing the rim of the knob 27.

A stud is threaded into an aperture in a surface plate such as 32 on which the gaging support is mounted. The stud is provided with an elongated opening 33 therein, which cooperates with a camming portion 34 formed on a shaft 35, which is suitably journaled in the upstanding rim 40 of the base, extends through the front thereof as seen in FIGURE 1, and has an operating hand-wheel or knob 36 mounted thereon. Thus by operating the knob 36 the shaft 35 is rotated, causing the cam member 34 to lock the probe support in a fixed position on the surface plate.

Returning now to the adjustment of the vertical column and hence of the position of the indicator gage probe 18 relative to a fixed point on a rotary table mounted on the surface plate 32, it will be seen that when the adjusting knob or wheel 27 is turned in one direction, the left-hand end of lever 23 is lowered, causing the lever to fulcrum about the roller 24 and the upper right-hand edge of the lever plate 23 to rise to elevate the right-hand end of the cover into a position such as that shown in FIGURE 3. Sufficient gap is provided between the left hand-rim 40 of the base and the cover plate so that the left-hand edge of the cover cannot engage the upper edge of the rim of the base 10.

The length of screw 26 and the poistion of the notch relative to the rim of the operating wheel 27 are such that there is always some deflection present in the column extension 21, resulting in the movement being smooth and reversible due to the spring effect of the parts, particularly the limited resilience of the cylinder shank 21.

As has been indicated above, the arrangement and relative proportions of the portions of the lever system are such that adjustments as small as a few millionths of an inch may be readily achieved. It will of course be apparent that the parts of the lever system, including the adjusting screw 26, are made of hardened steel so that there is no deformation of the parts resulting in inaccuracies.

While I have described a preferred form of my invention, it will be obvious that many variations thereof may be employed. I wish therefore not to be limited by the foregoing description.

What is claimed is:

1. A gaging probe support of the type having a base, a generally vertical column mounted on said base, a gaging probe mounted on a generally horizontal arm adjustable on a head in turn vertically adjustable on the column and means for locking the gaging probe in position, comprising, in combination, means fixedly mounting the column in said base, an arm fixed to said column at a point spaced from said base, said arm extending over a portion of said base, a fulcrum on said base remote from the column, and underlying said arm, a lever pivoted on said fulcrum and having a short end thereof extending away from the column bearing against said arm, and adjusting means mounted in said arm engaging the long end of said lever to cause said lever short end to act against said arm to deflect said column between the points of mounting to said base and said arm to thereby effect a fine adjustment of the position of the gaging probe.

2. A gaging probe support as claimed in claim 1, said fulcrum comprising a groove in said base and a cylindrical member resting in said groove.

3. A gaging probe support as claimed in claim 1 wherein the column has a cylindrical shank and said base and said arm are press-fitted to said shank, the axial distance between said press-fittings being substantially one-half the diameter of said cylindrical shank.

4. A gaging probe as claimed in claim 1, said arm being substantially coextensive with and forming a cover for said base.

5. A gaging probe as claimed in claim 1, said lever being loosely mounted on said arm.

6. A gaging probe support as claimed in claim 1 wherein means are provided for fixing said base to a surface for cooperation of the gaging probe with a work piece supported in position relative to said surface.

7. A gaging support as claimed in claim 1, said adjusting means being a screw having means limiting the movement thereof.

8. A gaging support as claimed in claim 4, said base having an upstanding rim, said rim enclosing said fulcrum and said lever.

9. A gaging support as claimed in claim 7, said limiting means comprising a plate mounted on said column adjacent the screw head, said plate having a notch into which a portion of the circumference of said screw head extends.

10. In a support for a gaging probe, in combination, a base, a column rigidly mounted in said base and extending perpendicular thereto, a cover member for said base, said cover member being fixed to said column at a point spaced axially of said column, means for supporting a gaging probe on said column for movement along and at right angles to said column axis, a fulcrum mounted in said base, a lever extending between said fulcrum and a point on said cover remote from said column, and an adjusting screw threaded in said cover and bearing against said lever at the end opposite said point on said cover to deflect said column between said base and cover to thereby adjust said probe through a minute arc.

References Cited

UNITED STATES PATENTS

| | | | |
|---|---|---|---|
| 860,084 | 7/1907 | Evans | 33—171 |
| 1,515,867 | 11/1924 | Masone | 33—171 |
| 2,177,921 | 10/1939 | Zofrey. | |
| 2,469,904 | 5/1949 | Szuba | 248—124 |
| 2,909,351 | 10/1959 | Pratt | 248—88 XR |
| 3,044,740 | 7/1962 | Pearce | 248—124 |

ROY D. FRAZIER, Primary Examiner

A. FRANKEL, Assistant Examiner

U.S. Cl. X.R.

33—171; 248—291